May 8, 1951
E. E. MOYER
2,552,206
THYRATRON CONTROL SYSTEM FOR SERIES MOTORS
Filed Oct. 21, 1948
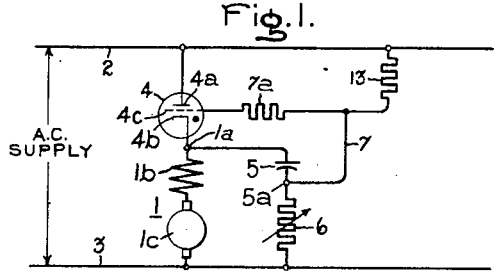
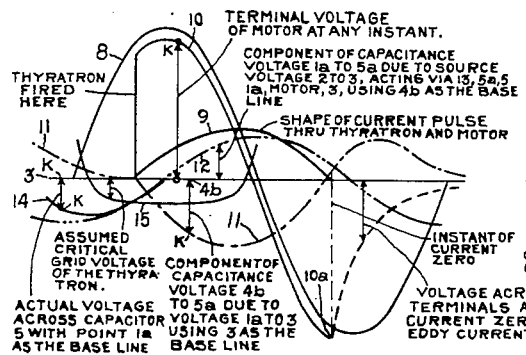
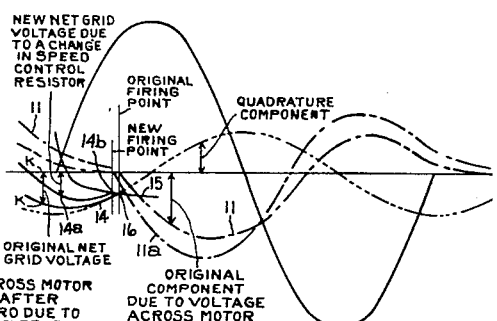
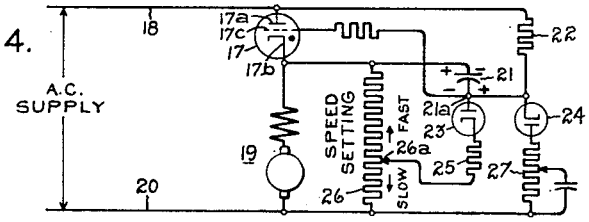
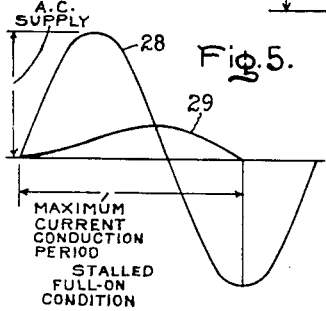
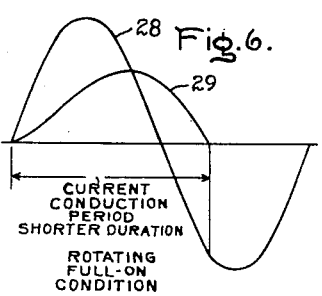
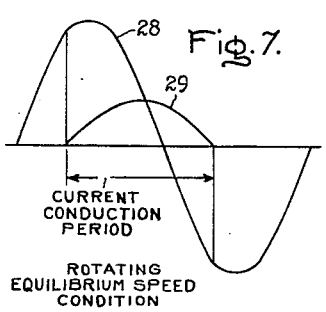
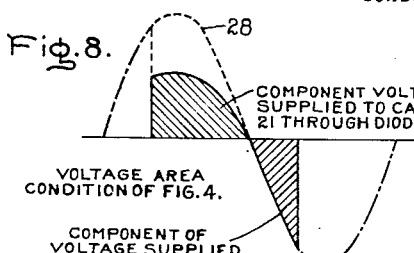
Inventor:
Elmo E. Moyer,
by Claude A. Mott
His Attorney.

Patented May 8, 1951

2,552,206

UNITED STATES PATENT OFFICE 2,552,206

THYRATRON CONTROL SYSTEM FOR SERIES MOTORS

Elmo E. Moyer, Scotia, N. Y., assignor to General Electric Company, a corporation of New York Application October 21, 1948, Serial No. 55,753

5 Claims. (Cl. 318—331)

1

This invention relates to control systems, more particularly to electronic control systems for series motors and it has for an object the provision of a simple, reliable, and inexpensive control system of this character.

Still more particularly, the invention relates to electronic control systems for series motors in which a series motor is supplied with half wave current pulses from a source of alternating voltage through an electric valve, and a more specific object of the invention is the provision of a control network for controlling the voltage supplied to the grid in such a manner that the motor may be given constant speed characteristics and by means of which a preset speed may be maintained automatically at the preset value over a wide range of load torque within the regulating limits of the electric valve and the L/R load constants.

In carrying the invention into effect in one form thereof, the armature and field circuit of a series motor are connected in series relationship with an electric valve across a source of alternating voltage. A resistance reactance network is provided which is supplied both from the terminals of the motor and from the source in such a manner that a component of alternating voltage dependent upon the speed of the motor and a second component in phase opposition to the first component and in quadrature with the anode voltage of the valve are supplied to the reactance element of the network. The difference of the two components is supplied to the grid of the valve to control the valve to maintain the speed of the motor constant at a value dependent upon the value of the resistance element of the network. This resistance element is variable to provide for presetting the speed of the motor at a desired value.

For a better and more complete understanding of the invention, reference should now be had to the following specification and to the accompanying drawing, of which Fig. 1 is a simple schematic diagram of an embodiment of the invention, Figs. 2 and 3 are characteristic curves which facilitate an understanding of the invention, Fig. 4 is a modification, and Figs. 5, 6, 7 and 8 are charts of characteristic curves which serve to facilitate an understanding of the operation of the modification of Fig. 4.

Referring now to the drawing, a series motor 1 having an armature winding 1c and a series field winding 1b is supplied from a suitable source of alternating voltage which is represented by the two supply conductors 2 and 3 to which the motor is connected in series with an electric valve 4.

2

Preferably the valve 4 is a gas-filled valve such as a thyratron. It is provided with an anode 4a, a cathode 4b and a control grid 4c. In the arrangement illustrated in Fig. 1 the anode 4a is connected to the supply conductor 2. Between the cathode 4b and the supply conductor 3 is connected the series motor 1.

The circuit of a series motor, armature and field windings exhibits characteristics of inductance L and resistance R connected between the terminals of the motor, in which the resistance R is different from the actual ohmic resistance of the windings and is therefore referred to as the apparent resistance.

A half wave rectifier when supplying a load comprising inductance L' and resistance R' connected in series, produces successive discontinuous pulses of current of a peak value, shape and duration dependent upon the ratio of L'/R'. When the inductance-resistance load of a half wave rectifier is the inductance L and apparent resistance R of a series motor, the circuit behaves for a given fixed firing point of the thyratron as though the apparent resistance R increases as the motor speed increases. Hence, the amount of this increase of apparent resistance is a measure of the amount of increase of motor speed.

For the purpose of measuring this apparent resistance, a network is provided which is connected across the terminals of the motor 1. In the form illustrated in Fig. 1, it comprises a reactance illustrated as a capacitor 5 and an adjustable resistor 6 connected in series relationship. The capacitor 5 may be replaced by an adjustable resistance if the resistance 6 is replaced by an inductance, if desired.

For the purpose of supplying to the grid of the thyratron a component of quadrature lagging alternating voltage the D.-C. component of which varies in magnitude and polarity as the apparent resistance and therefore as the speed of the motor, a connection 7 is provided from the junction point of the capacitor 5 and resistor 6 to the grid 4c of the thyratron. A resistor 7a is included in the connection for limiting the grid current to a low value.

Referring now to Fig. 2, the alternating voltage which is supplied to the anode of the thyratron is represented by the sinusoidal shaped curve 8. Assuming conditions of the circuit in which the thyratron is fired at 60°, the current through the path of the motor has the shape of the voltage drop across the equivalent resistance R of the motor. It is represented by the curve 9. For an L/R ratio of the series motor resulting in a time constant equivalent to 160° of a 60 cycle wave, the current pulse will end at approximately 247°. The voltage across the terminals of the motor is represented by the curve 10. It will be noted that the voltage across the motor terminals actually reverses and attains a negative value represented by the ordinate of the point 10a at the instant of current zero. Owing to eddy current effects in the iron of the motor, the voltage across the terminals does not drop instantaneously to zero but decays exponentially, as indicated by the dotted portion of the curve 10.

The parallel circuit which includes the capacitor 5 and resistor 6 has a current which is initiated when the thyratron fires. For an RC time constant equivalent to 120° of a 60 cycle wave the voltage across the capacitor 5 due to excitation from the motor terminal voltage is zero at approximately 240°. This voltage is represented by the sinusoidal curve 11. It will be noted that this component voltage across the capacitor does not remain zero like the current in the motor path but reverses and attains positive values. This is brought about by the exponential decay of the voltage across the motor terminals, which is indicated by the dotted portion of curve 10.

In addition to the component voltage across the capacitor represented by curve 11, a second component voltage is supplied to the capacitor from the supply conductors 2 and 3 to which the capacitor is connected through the resistor 13 and the armature and field path of the motor. This second component voltage is represented in the drawing by the sinusoidal curve 12. As indicated, it is substantially in quadrature lagging sense relative to the supply voltage 2—3. The second component, i. e. the component which is represented by curve 12, tends to phase control the thyratron in the "turn on" sense to cause the amount of current flow through the motor armature and field to increase to produce sufficient torque to accelerate the motor.

The two components represented by the curves 11 and 12 produce a resultant voltage on the capacitor 5. This resultant is the actual or net voltage of the capacitor and it is also the voltage which is applied between the cathode and grid of the thyratron. It is represented by the curve 14.

To increase the preset speed of the motor the resistance of the adjustable resistor 6 is decreased. This increases the amplitude of the component voltage of the capacitor 5 which is derived from the motor terminals, as illustrated by the curve 11a in Fig. 3. The component now crosses the zero axis earlier in the cycle than it did with the higher value of resistance 6, as illustrated by the comparison of curves 11 and 11a in Fig. 3. Consequently the new net voltage which is represented by the curve 14a in Fig. 3 crosses the critical grid voltage of the thyratron earlier than it did with the higher value of resistance. The critical grid voltage of the thyratron is represented by the curve 15 in Figs. 2 and 3. The earlier crossing is illustrated in Fig. 3. With the original higher value of the resistance 6 the resultant grid voltage 14 intersects the critical grid voltage 15 at the point 16 and the thyratron is fired at that point in the positive half cycle of anode voltage. With the new lower value of the resistor 6 the new resultant grid voltage 14a intersects the critical grid voltage at the point 14b and thus advances the firing point of the thyratron to a correspondingly earlier point in the positive half cycle of anode voltage.

As a result the voltage supplied to the motor is increased and its speed is correspondingly increased.

In a similar but reverse manner, if the resistance 6 is increased, the firing point of the thyratron is retarded and the speed of the motor is correspondingly decreased.

Also, if owing to a change in load, the speed of the motor falls below the preset value, the apparent resistance R of the motor decreases and this results in a corresponding increase in the L/R ratio. In consequence of the increase of the L/R ratio, the conduction period of the thyratron is lengthened and this increases the new component voltage which is supplied to the capacitor 5. The result of the increased component voltage, such as represented by the curve 11a, is to produce a new resultant voltage, such as represented by the curve 14a which intersects the critical grid voltage earlier and advances the firing point of the thyratron to increase the speed of the motor. Reversely if the speed of the motor should increase owing to a change of the shaft load, the firing point of the thyratron will be retarded and the speed of the motor will be correspondingly decreased.

Thus it will be noted that the firing of the thyratron is advanced and the speed of the motor increased in response to a decrease of the speed controlling resistor 6 or in response to a decrease in speed of the motor, and that the firing of the thyratron is retarded and the speed of the motor decreased in response to an increase of the speed controlling resistor or in response to an increase in the speed of the motor.

In the modification illustrated in Fig. 4, the anode 17a of thyratron 17 is connected to one A.-C. supply conductor 18 and the series motor 19 is connected between the cathode 17b and the other supply conductor 20. Between the cathode 17b and the grid 17c of the thyratron is connected a capacitor 21. A resistor 22 is connected between the supply conductor 18 and the terminal 21a of the capacitor 21 which is remote from the cathode 17b. Thus a path across the supply source 18 and 20 is provided for the capacitor 21 through the motor 19 and the resistor 22. As a result of this connection, an approximately quadrature lagging component alternating voltage appears across the terminals of the capacitor. The capacitor also receives a control voltage from the terminals of the motor which contain both an alternating and a direct component through two oppositely polarized paths. In one of these paths is connected the diode rectifier 23 and the other path includes the reversely connected diode rectifier 24. As shown, the anode of rectifier 23 is connected to the terminal 21a of the capacitor 21 and its cathode is connected through a resistor 25 to the slider 26a of a potentiometer 26 which is connected across the terminals of the motor. The cathode of the reversely connected rectifier is connected to the terminal 21a of the capacitor and the anode is connected through a resistor 27 to the supply conductor 20.

The net voltage of the capacitor 21, i. e. the sum of the component voltages described in the foregoing, is utilized to control the firing of the thyratron. By varying the position of the slider 26a, the "turn off" component of voltage, i. e. the component which is produced by conduction of diode 23, is preadjusted relative to the "turn on" component which results from the conduction of diode 24.

As an explanation of the operation that takes place to produce automatic control to maintain a constant preset speed of the series motor, consider the stalled conditions represented by the diagram of Fig. 5. As indicated, the thyratron is fired "full on," i. e. at the beginning of each positive half cycle of anode voltage which is represented by the sinusoidal curve 28. Current is limited only by the inductance and resistance of the motor windings. It is maintained longer than 180° by the inductance L of the circuit, as indicated by the curve 29, which represents current.

In Fig. 6 are illustrated the voltage and current conditions which exist when the armature is allowed to rotate. The magnitude of the average value of the current pulse in each positive half cycle diminishes as the speed increases owing to the counter voltage effect in the motor, (i. e. the increase in apparent R). The current pulse duration is decreased but the peak magnitude of the RI drop is increased, which is the same effect that would have been produced with the motor stalled if the resistance R of the circuit had been increased relative to a fixed inductance or if L had been decreased relative to a fixed R so as to reduce the L/R time constant ratio of these two circuit components.

An equilibrium condition during rotation is illustrated in Fig. 7. The firing of the thyratron is retarded and the current pulse assumes a shape which is dependent on the L/R ratio of the circuit constants.

In the absence of the diode rectifiers 23 and 24 a direct component voltage equal to the RI drop in the motor circuit produced by the current pulse through the motor would be impressed across the capacitor 21. However, the series RC circuit is modified by the inclusion of the oppositely poled diode valves 23 and 24. The diode 23 causes the positive portion of the wave to impress a component voltage on the capacitor and the diode 24 causes the negative portion of the wave to impress a component voltage of opposite polarity on the capacitor.

The potentiometer 26 divides the positive portion of the voltage wave. The capacitor 21 takes on a net direct voltage component corresponding to the difference of the positive and negative component voltages which are supplied through the diodes. This condition is illustrated in Fig. 8 in which the positive shaded area represents the component voltage supplied to the capacitor 21 through diode 23 via potentiometer 26 and the negative shaded area represents the component voltage supplied to the capacitor through diode 24 from the whole terminal voltage. For any preset subdivision of positive voltage wave there will be one condition of firing point of the thyratron relative to the point of zero current through the motor, which will result in zero voltage on the capacitor 21 at the instant of zero current through the motor.

If the motor is operating at a predetermined speed under steady state conditions of equilibrium, as represented by the curves of Fig. 8, and the shaft load of the motor is suddenly increased, the speed will begin to decrease. Consequently the motor current as represented by curve 29 continues further over into the negative half cycle of anode voltage, thereby increasing the component voltage supplied to the capacitor through diode 24, i. e. the negative shaded area is increased. The voltage across the capacitor becomes increasingly positive toward the grid of the thyratron and the firing point is advanced, thereby increasing the speed of the motor. Should the shaft load on the motor decrease, the reverse operation takes place.

In other words, there will be one speed and load of the motor corresponding to a predetermined L/R ratio of the motor circuit which if the thyratron is fired at a predetermined point will result in zero current through the motor at another corresponding predetermined point. If the speed and load conditions are not such as to produce firing of the thyratron and zero current through the motor at the instant of zero voltage across the capacitor, then the voltage across the capacitor will at such instant be positive or negative toward the grid of the thyratron as required to produce an equilibrium condition. The circuit connections are so chosen that the polarity of this capacitor voltage as applied to the grid of the thyratron will cause firing to occur sooner if the speed is lower than that required to produce zero voltage across the capacitor at the instant of zero motor current, or cause the firing to be delayed if the speed is greater than that required to produce zero voltage across the capacitor at the instant of zero motor current. Thus, the circuit tends to produce an equilibrium condition corresponding to a preset ratio of positive to negative voltage areas of voltage across the motor.

The purpose of the low magnitude quadrature lagging voltage across the capacitor which results from the connection through the motor and resistor 22 to the source 18 and 20 is to cause the net capacitor voltage to be rising from a negative value toward the grid of the thyratron at the zero-going positive point of the anode voltage for the purpose of producing smooth phase control. Then the varying direct voltage component which is derived from the voltage across the motor terminals may be considered as raising or lowering the axis of this quadrature lagging alternating component to produce a varying firing point.

Although in accordance with the provisions of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. In combination, a source of alternating voltage, an electric valve provided with an anode, a cathode and a control grid and having its anode connected to a first terminal of said source, a series motor connected between said cathode and the other terminal of said source, a circuit in parallel with said motor comprising a first resistance and a reactance connected in series with one terminal of said reactance connected to said cathode and one terminal of said resistance connected to said other terminal of said source, a resistance connected between said first terminal of said source and the junction point of said reactance and first resistance and a connection from said junction point to said grid.

2. In combination, a source of alternating voltage, an electric valve provided with an anode, a cathode and a control grid and having its anode connected to a first terminal of said source, a series motor connected between said cathode and the other terminal of said source, a circuit in parallel with said motor comprising a first resistance and a reactance connected in series for producing across said reactance a first component of alternating voltage, connections from said source to said reactance including a second resistance connected between said first terminal of said source and the junction point of said reactance and first resistance for supplying to said reactance a component of alternating voltage in quadrature with the voltage of said anode and substantially out of phase with said first component, and a connection from said junction point to said grid for supplying the difference of said component voltages to said grid.

3. In combination, a source of alternating voltage, an electric valve provided with an anode, a cathode and a control grid and having its anode connected to a first terminal of said source, a series motor connected between said cathode and the other terminal of said source, a parallel circuit connected from said cathode to said other terminal of said source comprising a reactance and a first resistance connected in series relationship with one terminal of said reactance connected to said cathode and one terminal of said reactance connected to said other terminal of said source for producing across said reactance a first component of alternating voltage, connections from said source through said motor including a second resistance connected between said first terminal of said source and the junction point of said reactance and first resistance for supplying to said reactance a component of alternating voltage in quadrature with the voltage of said anode and substantially in phase opposition to said first component and a connection from an intermediate point of said parallel circuit to said grid for supplying the difference of said component voltages to said grid to control the speed of said motor, said first resistance being variable to provide for presetting a speed for said motor.

4. In combination, a source of alternating voltage, a gas-filled electric valve provided with an anode, a cathode and a control grid and having its anode connected with one terminal of said source, a series motor connected between said cathode and the other terminal of said source, a first resistor having one terminal connected to said other terminal of said source, a capacitor connected between the other terminal of said resistor and said cathode to provide for applying to said capacitor a component of alternating voltage having a magnitude dependent on the speed of said motor, a connection including a second resistor from the anode terminal of said source to the junction point of said first resistor and capacitor for supplying to said capacitor a second component of alternating voltage in quadrature with the voltage of said anode and substantially in phase opposition to said first component, a connection from the junction point of said first resistor and capacitor to said grid for supplying to said grid the difference of said component voltages to control the speed of said motor, said first resistor being variable to preset an operating speed for said motor.

5. In combination, a source of alternating voltage, an electric valve provided with an anode, a cathode and a control grid and having said anode connected to a first terminal of said source, a series motor connected between said cathode and the other terminal of said source, a potentiometer connected across said motor, a capacitor having a first terminal connected to said cathode, a connection including a diode valve and a resistance connected in series between the second terminal of said capacitor and the slider of said potentiometer, a reversely connected diode valve and a resistance connected in series between said second capacitor terminal and said other terminal of said source, a resistance connected between said first terminal of said source and said second terminal of said capacitor, and a connection from said second terminal of said capacitor to said grid.

ELMO E. MOYER.

REFERENCES CITED

The following references are of record in the file of this patent:

UNITED STATES PATENTS

| Number | Name | Date |
|---|---|---|
| 1,985,003 | Von Engle et al. | Dec. 18, 1934 |
| 1,987,720 | Staege | Jan. 15, 1935 |
| 2,236,086 | Conover | Mar. 25, 1941 |